(12) United States Patent
Swinkels et al.

(10) Patent No.: US 9,118,421 B2
(45) Date of Patent: *Aug. 25, 2015

(54) EXTENDING CONTROL PLANE FUNCTIONS TO THE NETWORK EDGE IN AN OPTICAL TRANSPORT NETWORK

(75) Inventors: Gerard L. Swinkels, Ottawa (CA); Darek Skalecki, Kanata (CA); Anurag Prakash, Noida (IN); Mohit Chhillar, Delhi (IN)

(73) Assignee: Ciena Corporation, Hanover, MD (US)

( * ) Notice: Subject to any disclaimer, the term of this patent is extended or adjusted under 35 U.S.C. 154(b) by 426 days.

This patent is subject to a terminal disclaimer.

(21) Appl. No.: 13/567,154

(22) Filed: Aug. 6, 2012

(65) Prior Publication Data

US 2013/0308948 A1 Nov. 21, 2013

(30) Foreign Application Priority Data

May 16, 2012 (IN) .......................... 1500/DEL/2012

(51) Int. Cl.
*H04B 10/27* (2013.01)
*H04L 12/24* (2006.01)
*H04L 12/715* (2013.01)
*H04L 12/721* (2013.01)

(52) U.S. Cl.
CPC ................ *H04B 10/27* (2013.01); *H04L 41/12* (2013.01); *H04L 45/62* (2013.01); *H04L 45/64* (2013.01)

(58) Field of Classification Search
None
See application file for complete search history.

(56) References Cited

U.S. PATENT DOCUMENTS

| 6,791,948 | B1 * | 9/2004 | Desnoyers et al. | 370/254 |
| 2003/0172362 | A1 * | 9/2003 | Mack-Crane et al. | 716/12 |
| 2011/0292832 | A1 * | 12/2011 | Bottari et al. | 370/254 |
| 2012/0254555 | A1 * | 10/2012 | Miwa et al. | 711/154 |

* cited by examiner

*Primary Examiner* — Chi H Pham
*Assistant Examiner* — Shick Hom
(74) *Attorney, Agent, or Firm* — Clements Bernard PLLC; Christopher L. Bernard; Lawrence A. Baratta, Jr.

(57) ABSTRACT

A method of extending the control plane to a network edge for a network having first set of nodes of the network are designated as core nodes, each core node being operable to route subscriber traffic between a pair of neighbor core nodes and a second set of control-plane enabled nodes of the network designated as tail nodes, each tail node connected to a core node and operating only as a source or sink of subscriber traffic. Each core node that is connected to at least one tad node is designated as a host node. The host node is controlled to advertise summary information of its connected tail nodes to other core and tail nodes in the network, thus making it possible to extend control plane function to the tail nodes which can calculate connection routes, set-up/tear-down connections and perform connection failure recovery functions.

21 Claims, 4 Drawing Sheets

EXTENDING CONTROL PLANE FUNCTIONS TO THE NETWORK EDGE IN AN OPTICAL TRANSPORT NETWORK

CROSS-REFERENCE TO RELATED APPLICATIONS

The present non-provisional patent claims the benefit of priority of co-pending Indian Patent Application No. 1500/DEL/2012, filed on May 16, 2012, and entitled "EXTENDING CONTROL PLANE FUNCTIONS TO THE NETWORK EDGE IN AN OPTICAL TRANSPORT NETWORK," the contents of which are incorporated in full by reference herein.

FIELD OF THE INVENTION

The present application relates generally to management of optical communications networks, and more specifically, to methods of extending control plane functions to the network edge in an optical transport network.

BACKGROUND

FIG. 1A schematically illustrates the logical architecture of an Optical Transport Network (OTN) in accordance with ITU-T recommendation G.8080/Y.1304, entitled Architecture for the Automatically Switched Optical Network (ASON), the entire content of which is incorporated herein by reference. As may be seen in FIG. 1A, the network 2 is logically divided into a transport plane 4 and a control plane 6.

The Transport Plane 4 comprises a plurality of switches 10 interconnected by Physical Interfaces (PIs) 12, and is responsible for transporting subscriber traffic via end-to-end connections provisioned through the network. The Control Plane 6 comprises an Optical Connection Controller (OCC) 14 associated with each switch 10 of the transport plane 4, and is responsible for resource and connection management within the transport plane 4. In the illustrated architecture, one OCC 14 is associated with a respective one switch 10 for clarity. In fact, the ASON permits an OCC 14 to manage multiple switches 10, if desired. Each OCC 14 is connected to its corresponding switch 10 of the transport plane 4 via a Connection Controller Interface (CCI) 16 which enables the respective OCC 14 to implement control plane functionality for its corresponding switch 10. Within the Control Plane 6, the OCCs 14 are interconnected via Network to Network Interfaces (NNIs) 18, and provide a set of network resource and connection management functions. These functions may, for example, include: network topology discovery (resource discovery); address assignment; path computation, connection set-up/tear-down; connection protection/restoration; traffic engineering; and wavelength assignment. Other management functions can be implemented by the control plane 6, as desired.

A physical node of the network will typically incorporate both a Transport Plane switch 10 and its corresponding Control Plane OCC 14, although this is not essential. In some cases, a Transport Plane switch 10 and its corresponding Control Plane OCC 14 may be provided in separate physical machines. For example, the respective OCCs 14 of one or more switches 10 may be hosted on a server (not shown).

Client premised equipment (CE) 20, which may be a server or a router, for example, can send and receive packets that contain information for both the Transport Plane 4 and the Control Plane 6. For this purpose, the CE may be connected to a switch 10 of the Transport Plane 4 via a PI 12, and to its corresponding OCC 14 via a User Network Interface (UNI) 22.

FIG. 1B presents a simplified view of the network architecture of FIG. 1A, in which the switches 10 and their associated OCCs 14 are represented by network nodes 24 connected by inter-node links 26 (each of which includes a PIs 12 and its corresponding NNI 18). Similarly, the CE 20 is represented as being connected to a network node 24 via an access link 28 which, in the illustrated embodiment, includes a PI 12 and a UNI 22.

Referring to FIG. 2, it is customary to extend the architecture of FIG. 1B to implement access gateways (AGs) 30 between the CEs 20 and the network 2. An access gateway 30 may also be referred to as an access server or an aggregation server. The function of the access gateway 30 is to provide an interface between one or more CEs 20 and the network 2. Among other things, an AG 30 enables a service provider to aggregate traffic flows to and from multiple CEs 20, which increases the number of CEs 20 that can access the network 2, while making better use of the bandwidth capacity of the access links 28 to the network 2. The use of an AG 30 also simplifies the implementation of dual-homed connections to the network 2, which has a benefit of removing a single point of failure in the path to and from the CEs 20. In the example of FIG. 2, AG-1 is dual homed to the network 2 via respective access links 28 to network nodes A and B, while AG-m is single-homed to the network 2 via an access link 28 to node B.

It would be desirable to extend the control plane 6 to include the AGs 30. This would be beneficial in that, among other things, each AG 30 would then be able to participate in topology discovery, path computation, connection set-up/tear-down and failure recovery functions offered by the OTN control plane 6. As is known in the art, topology discovery requires the exchange of link state messages between each of the OCCs 14 of the control plane 6, and the use of such state messages to accumulate a respective topology database for each OCC 14. Such topology database can then be used by an OCC 14 to compute connection routes through the network 2. Open Shortest Path First (OSPF) is a well-known protocol which defines various types of Link State Advertisement (LSA) messages that may be used for this purpose. Other protocols are also known, which also use inter-OCC messaging for topology discovery and route computation. For ease of description in this application, explicit reference will be made to LSA messages, it being understood that such references are also intended to encompass other message types and protocols that may be used in the control plane to implement topology discovery and route computation functions for the network 2.

In a full-mesh network, both the volume of LSA traffic and the size of the topology database increases with $N^2$, where N is the number of nodes participating in the control plane 6. In a network environment in which there are a large number of AGs 30, extending the control plane 6 to include the AGs 30 can lead to a proliferation of LSA traffic and require a very large topology database, both of which may degrade the topology discovery, route computation, and failure recovery functions of the control plane 6.

Techniques that enable extension of the OTN control plane 6 without unduly degrading control plane performance, remain highly desirable.

SUMMARY

An aspect of the present invention provides a method of extending control plane functions to the network edge in an optical transport network having a transport plane for carrying subscriber traffic within end-to-end connections, and a control plane for managing at least a portion of resources of the transport plane allocated to the connections. A first set of control-plane enabled nodes of the network is designated as core nodes, each core node being operable to route subscriber traffic between a pair of neighbour core nodes in the network. A second set of control-plane enabled nodes of the network is designated as tail nodes, each tail node being connected to a core node and operating only as a source or sink of subscriber traffic into or from the network. Each core node that is connected to at least one tail node is designated as a host node. The host node is controlled to advertise summary information of its connected tail nodes to other nodes in the network.

BRIEF DESCRIPTION OF THE DRAWINGS

Further features and advantages of the present invention will become apparent from the following detailed description, taken in combination with the appended drawings, in which.

DETAILED DESCRIPTION

For the purposes of the present disclosure, a distinction is made between the core nodes and tail nodes, based on the type of transport plane traffic forwarding that can be supported by each node. For the purposes of the present disclosure, a "core node" is considered to be a node through which transport plane traffic can be routed between two adjacent core nodes. The set of core nodes within the network may be taken together as defining a "core network" or, equivalently, a "network core". In contrast, a "tail node" is considered to be a node that can not operate to route transport plane traffic between two adjacent core nodes, but rather is limited to sourcing (and sinking) traffic to (and from) the network and routing traffic between its directly subtending CEs. In addition to these definitions, it is convenient to identify each core node through which a tail node may obtain access to the network. Such core nodes may be referred to as "host nodes".

Figure 1A:
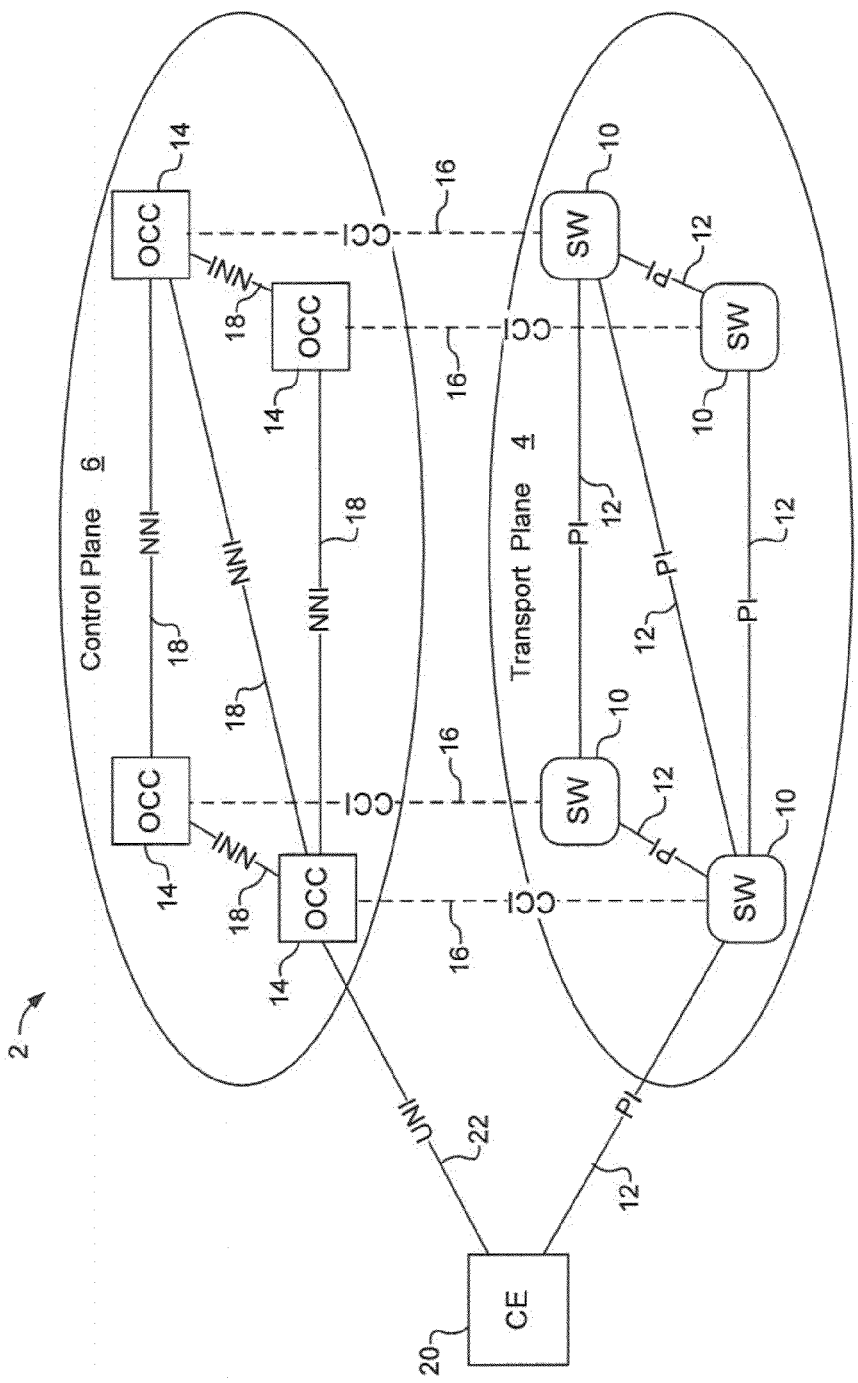
FIGS. 1A and 1B are block diagrams schematically illustrating the logical structure of an Automatically Switched Optical Network (ASON) known in the prior art.
Figure 1B:
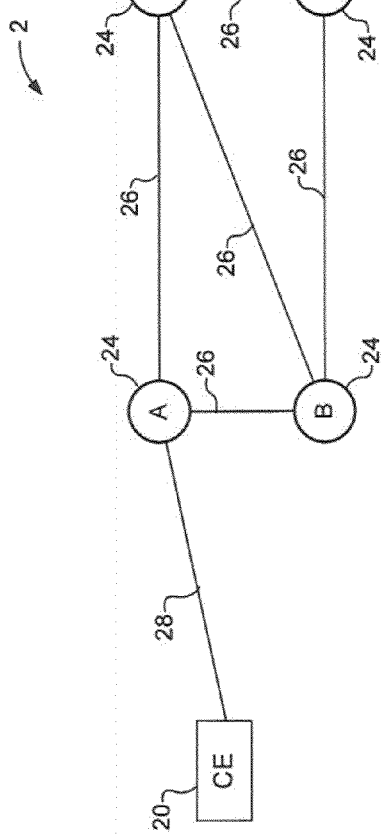
Figure 2:
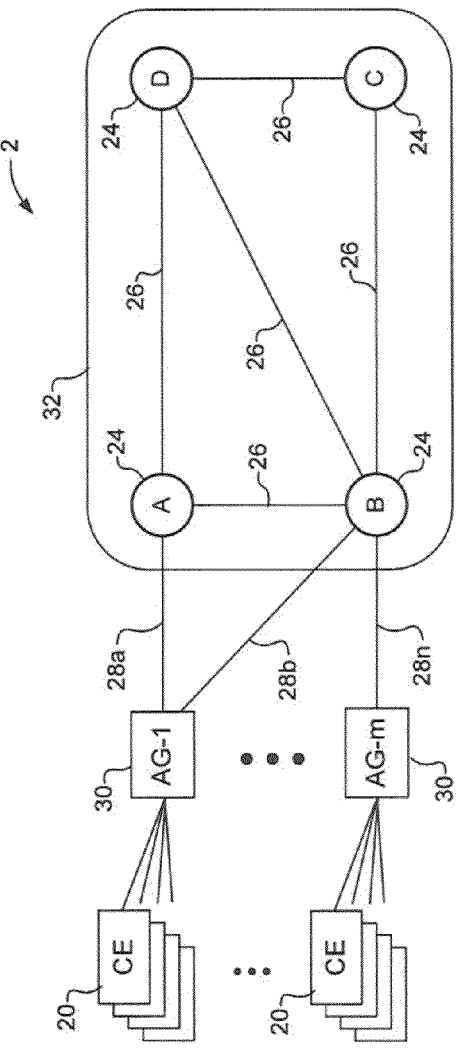
FIG. 2 is a block diagram schematically illustrating extension of the ASON structure of FIG. 1A to include access gateways between the ASON and Customer premised equipment.

In the example of FIG. 2, each node 24 represents a core node, because it can route subscriber traffic between two neighbour core nodes 24 within the core network 32. For example, node A can route subscriber traffic between neighbour (core) nodes D and B. On the other hand, each AG 30 is an example of a tail node, because it only operates to forward traffic between its connected CE(s) 20 and a core node 24 of the network 2. As such, an AG 30 can only source (and sink) subscriber traffic flows into (and from) the network 2, or route subscriber traffic flows between two CEs 20 connected to itself. Even in the case of dual homed AG-1, subscriber traffic can not be routed between neighbour (core) nodes A and B (eg via access links 28a and 28b). Any traffic arriving at AG-1 from core node A, for example, must either be passed to a CE 20, or must be dropped; it cannot be forwarded to core node B.

It should be noted that tail nodes are not limited to AGs 30 hosting CEs 20. A tail node can be any node that operates solely to source and sink transport plane traffic to and from the network 2. Thus, for example, a CE 20 which is directly connected to a core node 24 can be treated as a tail node, if desired. Similarly, a gateway between two networks (or sub-networks) can be a tail node if it serves only as a transit point for traffic flows originating in one network, and terminating in the other network (and so is seen as a traffic source or sink in any given one of the involved networks).

As may be appreciated, the distinction between tail nodes and core nodes is based on the role that each node plays in the network, rather than its physical construction or location. Thus it is possible for a tail node and a core node to be physically identical, if desired, in which case the difference between the two types of nodes would lie in their respective control software. Similarly, there is no requirement for core nodes and tail nodes to be installed at geographically dispersed locations, although it is contemplated that this will normally be the case.

In a conventional Optical Transport Network (OTN) in accordance with ITU-T recommendation G.8080/Y.1304, the span of the control plane 6 is limited to core nodes, so that the control plane 6 can provide (inter alia) topology discovery, route computation, connection set-up/tear-down and protection/restoration functions for subscriber traffic flows within the network. Because the number of tail nodes can be very large (e.g. reaching 10000 or more in a large network), tail nodes are excluded from the control plane 6, so as to avoid proliferation of control plane messaging and exponential growth of control plane messaging and topology databases, both of which may tend to degrade control plane performance.

The Applicants have discovered that the control plane 6 can be extended to provide control plane functionality to tail nodes, by implementing conventional OCC functionality in each tail node, and suitably controlling the size and propagation of LSAs through the host nodes.

Figure 3:
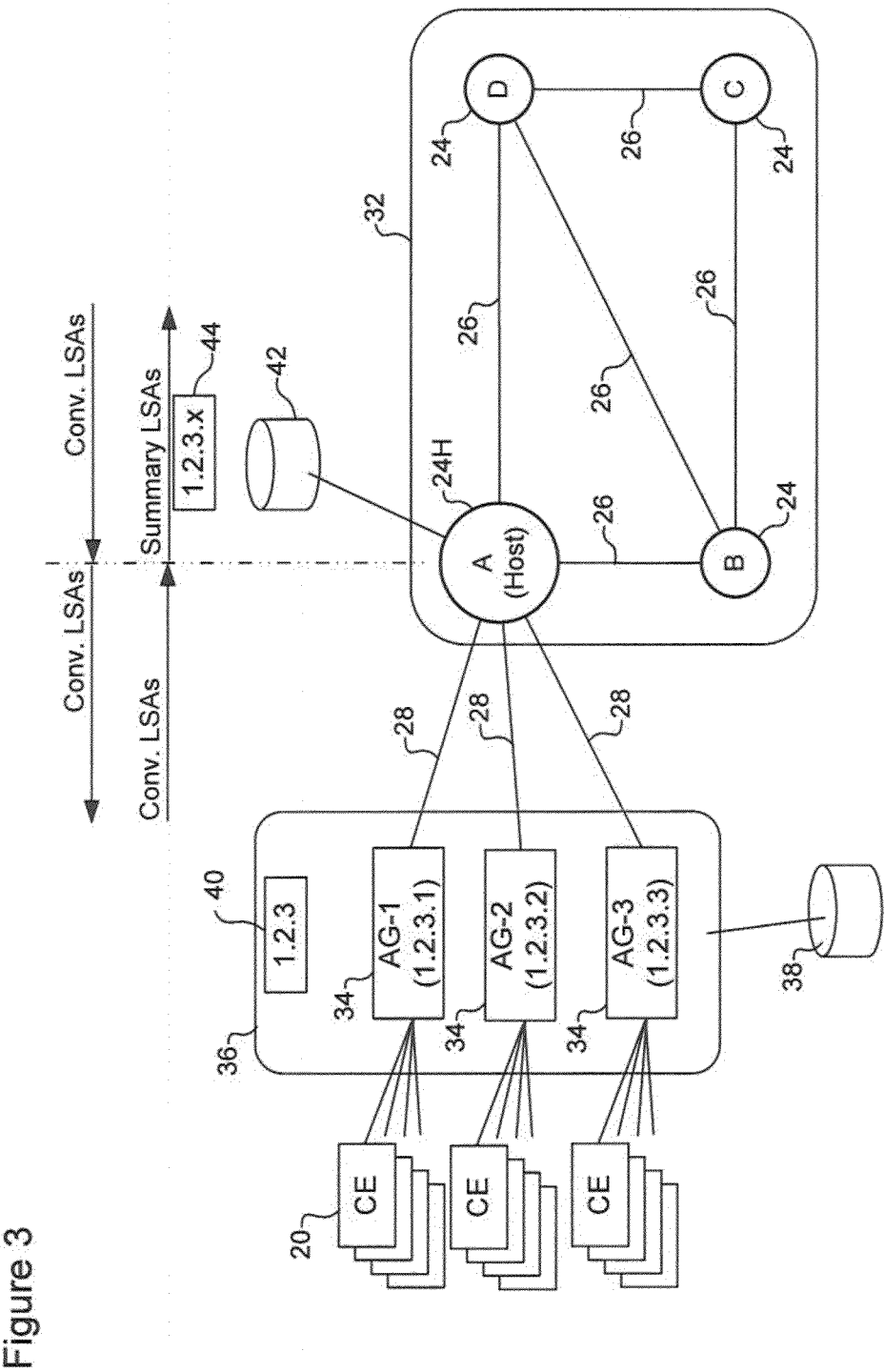
FIG. 3 is a block diagram schematically illustrating a network implementing a first representative embodiment of the present invention.

Referring to FIG. 3, there is shown a representative embodiment in which a set of three control-plane enabled tail nodes 34 (AG-1, AG-2 and AG-3) are logically associated with an area 36 and connected to a host node 24H via respective access links 28. A topology database 38 associated with the area 36 is populated with topology information of the network 2, and thus can be used in a conventional manner to enable the tail nodes 34 to compute end-to-end routes through the network 2 using conventional methods. Typically, the topology database 38 used by a given control plane enabled tail node 34 is maintained by the OCC 14 associated with that tail node 34. Where two or more tail nodes 34 are managed by a common OCC 14, those tail nodes 34 will share a common topology database 38. On the other hand, when tail nodes 34 are not managed by a common OCC 14, then each tail node 34 will utilize its own topology database 38.

The set of tail nodes 34 may be geographically dispersed or may be physically co-located, as desired. In the case of geographically dispersed tail nodes 34, each tail node 34 may maintain a respective instance of the topology database 38. On the other hand, co-located tail nodes 34 may share a common instance of the topology database 38, if desired. Connections over the access links 28 between tail nodes 34 and the host node 24H may utilize either User-Network-Interface (UNI) or Network-Network-Interface (NNI) connections in the control plane, as desired.

The logical allocation of tail nodes 34 to the area 36 may be based on any suitable criteria. In the embodiment of FIG. 3, the chosen criterion is connection to the host node 24H, such that the area 36 encompasses all of the tail nodes 34 connected to the host node 24H. Other criteria may be used, as will be apparent from the following description.

The area 36 is preferably referenced using a unique area identifier 40, which may be defined in any suitable manner. In the embodiment of FIG. 3, the area identifier 40 is derived from respective addresses of the involved tail nodes 34. In particular, the area 36 encompasses three tail nodes 34, namely AG-1, AG-2 and AG-3, whose addresses are "1.2.3.1", "1.2.3.2" and "1.2.3.3", respectively. All of these addresses contain a common prefix portion "1.2.3", which may conveniently be used as the area identifier 40 as shown in FIG. 3. In an alternative embodiment, the area identifier 40 may be derived from the respective address of the host node 24H. Since every core node 24 in the network has a unique network address, derivation of the area identifier 40 from the host node address enables the host node 24H or a management server (not shown) in communication with the host node 24H to independently derive an area identifier 40 that is unique within the network 2. This arrangement is advantageous in that it eliminates the need for a network service provider to manually provision area identifiers 40 while at the same time ensuring that each area identifier 40 is unique across the network 2.

The host node 24H is preferably provided with a network topology database 42. The network topology database 42 may be populated in a convention manner based on LSAs received by the host node 24H from the other core nodes 24 in the network 2, and so may be used in a convention manner for computation of routes through the network 2. As will be described in greater detail below, the network topology database 42 may also be populated based on LSAs received from the tail nodes 34 connected to the host node 24H, and used to enable computation of routes between the host node 24H at its attached tail nodes 34.

It is a simple matter to implement OCC functionality for each tail node 34, which thereby enables the upgraded tail node 34 to participate in the control plane 6. Consequently, each upgraded (i.e. control-pane enabled) tail node 34 is capable of exchanging LSAs with its connected host node 24H, populate its topology database 38, and compute routes through the network 2 in a conventional manner.

The host node 24H is configured (for example operating under suitable software control) to implement different LSA forwarding rules, for example depending on whether LSA messages are received from one of its attached tail nodes 34 or from neighboring core nodes 24 in the network 2.

In some embodiments, LSAs received by the host node 24H from a neighboring core node 24 are forwarded to its attached tail nodes 34 in a conventional manner. With this arrangement, a tail node 34 will receive LSAs originating from core nodes 24 in the network 2, and so can populate its topology database 38 with information enabling it to calculate end-to-end routes through the network 2.

In other embodiments, LSAs received by the host node 24H from a neighboring core node 24 are not forwarded to its attached tail nodes 34. With this arrangement, tail nodes 34 are not capable of calculating end-to end routes through the network 2, and must therefore interact with the host node 24H to calculate end-to-end routes through the network 2. Known techniques such as, for example Path Computation Element (PCE) and loose hop routing mechanisms may be used for this purpose.

On the other hand, LSAs received by the host node 24H from its attached tail nodes 34 are not propagated into the network 2 in a conventional manner, but rather are used to derive summary information which is then advertised into the network 2. The advertisement of summary information enables other nodes in the network 2 to populate their topology databases and compute end-to-end routes through the network 2, while at the same time limiting the propagation of tail node originated LSAs into the network 2.

In some embodiments, the summary information advertised by the host node 24H comprises a summary address 44 which is based on the area identifier 40 of the area 36 to which each tail node 34 is allocated.

For example, in the embodiment of FIG. 3, the summary address 44 is a four-byte address comprising the three-byte area identifier 40 "1.2.3" concatenated with a one-byte suffix portion populated with wildcard character ("x" in FIG. 3) to define a four-byte address that summarizes the respective addresses of the tail nodes 34. Alternatively, the summary address may be comprised of only the three-byte area identifier 40 "1.2.3", since the wildcard suffix is implicit. Advertisement of the summary address 44 into the network 2 by the host node 24H ensures that connections destined for any of one of the tail nodes 34 will be routed through the host node 24H.

As may be appreciated, each tail node 34 will be represented in the network 2 by a respective tail node address that conforms to the summary address 44, but with the suffix portion populated with a node identifier that uniquely identifies a respective tail node 34 within its area 36.

For ease of compatibility with link state messaging protocols being used in the network 2, it is convenient to define the format of the summary address 44 in conformance with the addressing scheme of the network 2. However, this is not essential. In general, any address format that enables the summary address 44 to be advertised into the network 2, and which enables computation of routes to desired tail nodes 34 may be used. For example, other summarizable area identifier formats that can be used include those based on IPv6 or Network Service Access Point (NSAP).

As may be appreciated, the advertisement of summary address information into the network 2 by the host node 24H means that a single LSA message and topology database entry can be used to represent a plurality of tail nodes 34, thereby reducing control plane messaging relative to conventional methods. A further reduction in control plane messaging can be obtained by limiting the frequency with which the host node 24H advertises changes in the state affecting its tail nodes 34. In particular, under conventional control plane protocols, any change in state affecting a node immediately triggers a corresponding LSA message notifying the other nodes of the change. However, because tail nodes 34 are not critical for traffic routing in the network 2, the host node 24H may defer advertising tail node 34 state changes into the network 2.

In some embodiments, the host node 24H may advertise the state affecting its connected tail nodes 34 on a predetermined schedule, such as, for example once every half hour. Thus, for example, the host node 24H may accumulate information of state changes affecting its tail nodes 34 during a given interval of time, and then generate a single LSA message containing a summary of changes accumulated during that interval, or simply the latest states affecting the tail nodes 34.

In some embodiments, the host node 24H may advertise the state affecting its connected tail nodes 34 after a predetermined number of changes have occurred. Thus, for example, the host node 24H may accumulate information of state changes affecting its tail nodes 34 until a predetermined number of state changes have been recorded, and then generate a single LSA message containing a summary of the accumulated state changes, or simply the latest states affecting the tail nodes 34.

Figure 4:
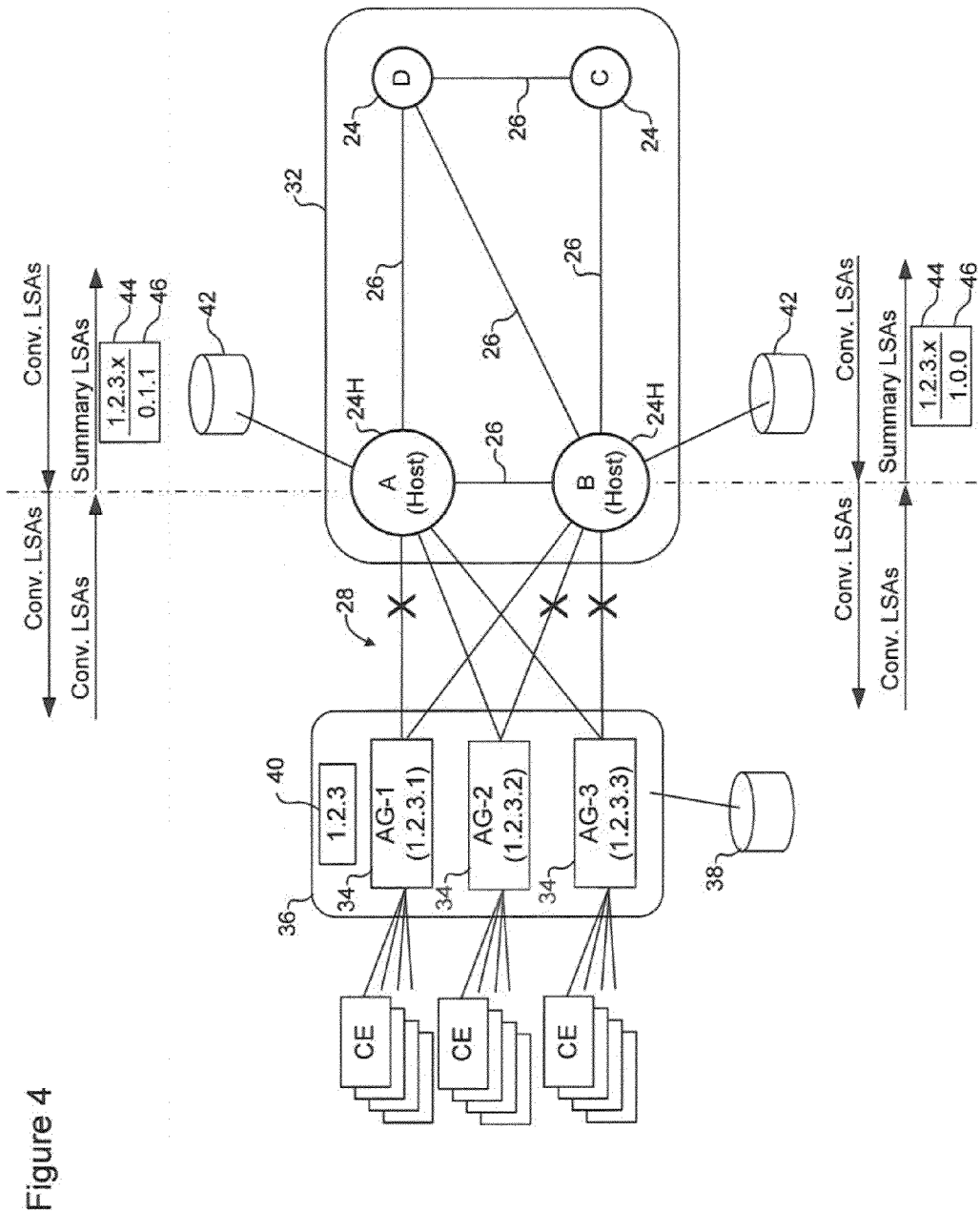
FIG. 4 is a block diagram schematically illustrating a network implementing a second representative embodiment of the present invention It will be noted that throughout the appended drawings, like features are identified by like reference numerals.

In the embodiment of FIG. 3, each of the tail nodes 34 is single-homed on core node A, acting as host node 24H. FIG. 4 illustrates an embodiment in which the tail nodes 34 are dual-homed on host nodes A and B of the network 2. Both of the host nodes 24H can operate in a manner similar to that described above to advertise summary information of their attached tail nodes 34 into the network 2. However, in embodiments in which the area identifier 40 is automatically derived by the host node 24H, the algorithm implemented in each host node 24H should operate to ensure that a single area identifier 40 is adopted and used by both host nodes 24H, so that each tail node 34 is consistently identified in the network 2. In embodiments in which the area identifier 40 is derived from the tail node addresses, this result will automatically be obtained simply by implementing the same algorithm in each host node 24H.

Additionally, for each tail node 34, one of the access links 28 may be disabled or blocked in a known manner. In FIG. 4, this disabled/blocked state is indicated by a "X" in each of the affected access links 28. Thus, in the example of FIG. 4, tail node AG-1 is currently connected to the network 2 via its access link 28 to core (host) node B, while tail nodes AG-2 and AG-3 are currently connected to the network 2 via their respective access links 28 to core (host) node A. It would be desirable to efficiently advertise this connectivity information to other nodes in the network 2.

One method by which the host nodes 24H can advertise connectivity information is to define a connectivity vector 46, which may take the form of a binary sequence in which each bit position represents a respective one of the tail nodes 34 in the area 36, and the binary value of that bit position represents whether or not that tail node 34 can be reached through the advertising host node 24H. In use, each host node 24H can derive a respective connectivity vector 46 based on the status of its inter-connecting links 28 to each tail node 34 in a given area 36, and advertise the connectivity vector 46 along with the address summary 44 described above. Based on this information, other nodes in the network 2 can determine which of the host nodes 24H can be used to reach a desired tail node 34, and so compute routes to the desired tail node 34 via the appropriate one of the host nodes 24. In the example of FIG. 4, host node A advertises summary information 44 comprising summary address 44 "1.2.3.x" and connectivity vector 46 "0.1.1", indicating that tail node addresses "1.2.3.2" and "1.2.3.3" (i.e. "1.2.3.x"; where x=2 and x=3) can be reached via host node A. Conversely, host node B advertises summary information comprising summary address 44 "1.2.3.x" and connectivity vector 46 "1.0.0", indicating that tail node address "1.2.3.1" (i.e. "1.2.3.x"; where x=1) can be reached via host node B. By this means, other nodes in the network 2 can use the summary information to identify the host node 24 through which a desired tail node 34 can be reached, and compute a route through the network 2 to the desired tail node 34 through that host node 24.

This approach is beneficial in that it increases the likelihood that routes can be successfully set up to desired tail nodes 34 on the first attempt, and thereby avoid undesirable control plane signalling associated with trying to find the appropriate host node 24 through which to route by "trial and error", at a cost of advertising only one additional bit for each tail node 34 in a given area 36 and the summary area identifier 40.

In some embodiments, each bit position of the connectivity vector 46 may be resolvable to determine the tail node address of a corresponding tail node 34. In the example of FIG. 4, the area identifier 40 "1.2.3" can be combined with the bit position of the connectivity vector 46 to obtain the tail node address of a specific one of the tail nodes 34. Thus resolved, the tail node address can be used to calculate a route and set up a connection through the network 2 to the appropriate host node 24, which can then use the tail node address to extend the connection through to the appropriate one of the tail nodes 34.

In the foregoing examples, an area identifier 40 is used as a means to reference a set of one or more associated tail nodes 34 in the network 2. In some embodiments, the association between the tail nodes 34 may simply be that they are connected to a given host node 24. Alternatively, areas may be defined such that all of the tail nodes 34 within a given area 36 (and so assigned a given area identifier 40) have identical connections to the network 2. Thus for example, the set of tail nodes 34 single homed on one host node 24 shown in FIG. 3 may be assigned to a first area 36, while the set of tail nodes 34 dual-homed on host nodes 24 A and B in FIG. 4 may be assigned to a second area 36. With this arrangement, a differentiation can be made between single-homed and dual-homed tail nodes 34, which may, for example, be treated differently. For example, the use of a connectivity vector 46 is primarily useful for dual-homed tail nodes 34. Thus, in some embodiments, the summary information advertised by a host node 24 may only include the connectivity vector 46 for those tail nodes 34 that are dual homed.

In the foregoing examples, the connectivity vector 46 is provided as a binary sequence in which each bit position represents a respective one of the tail nodes 34 in the area 36, and the binary value of that bit position represents whether or not that tail node 34 can be reached through the advertising host node 24H. This arrangement is beneficial in that it facilitates route computation with minimal overhead, as noted above. However, in some cases, it may be desirable to advertise connectivity information with a finer granularity than is possible with a single bit. Accordingly, if desired, the connectivity vector 46 may be formatted such that each tail node 34 is associated with a respective set of two of more bit positions, which may be used alone or in combination to convey information regarding connectivity between the advertising host node 24 and the involved tail node 34.

For example, consider a network in which access links 28 may be configured in any one of four different bandwidths, including: zero (i.e. no bandwidth); Optical channel Data Unit (ODU)-0 (i.e. 1.24416 Gbit/s); ODU-1 (i.e 2×ODU-0 or approximately 2.49877 Gbit/s); and ODU-2 (i.e. 4× x ODU-1 or approximately 10.03727 Gbit/s). This connectivity information may be conveyed by a connectivity vector 46 formatted to provide a set of two bit positions for each tail node 34, with the binary value represented by the 2-bit set indicating a respective one of the four possible bandwidth states of the access link 28 between the advertising host node 24 and the relevant tail node 34. Thus, for example, a value of "00" may indicate that the respective tail node 34 is not reachable; a value of "01" may indicate that the respective tail node 34 is reachable for connections up to an ODU-0 bandwidth; a value of "10" may indicate that the respective tail node 34 is reachable for connections up to an ODU-1 bandwidth; and a value of "11" may indicate that the respective tail node 34 is reachable for connections up to an ODU-2 bandwidth. Other formats of the connectivity vector 46, and the meanings will become apparent to those of ordinary skill in the art, and may be used without departing from the intended scope of the appended claims.

Based on the foregoing description, it will be seen that the present technique utilizes a summary address 44 and connectivity vector 46 to advertise reachability of tail nodes 34 in the network. This arrangement offers numerous benefits over the conventional mechanisms by which information about tail nodes 34 and links 28 inter-connecting tail nodes 34 and host nodes 24 may be advertised in the network 2. More particularly, if it was desired to advertise information about tail nodes 34 and access links 28 in the conventional manner then:

a) Each tail node 34 would advertise a Nodal LSA. At minimum this includes the address of the tail node 34 which is similar in size to the summary address 44, i.e. 4 bytes; and b) For each link 28 inter-connecting a tail node 34 to a host node 24, the tail node 34 would advertise a Link LSA, and the host node 24 would advertise a Link LSA also. Information in both Link LSAs would be pretty much the same (except local and remote information would be reversed) and such information can easily reach 100 bytes in some implementations (eg: OSPF-TE).

So, in conventional methods, for each tail node 34 there would be advertisement of one Nodal LSA and two Link LSAs per each link 28 interconnecting tail node 34 to host node 24. If tail nodes 34 are interconnected to host nodes 24 via many links 28 then 2 Link LSAs are advertized per each link 28.

By contrast, in the present technique, these three (or more) LSAs are replaced by a single summary address 44 and a connectivity vector 46. In practice, the summary address 44 advertised by the host node 24 is approximately equivalent in size to a single Nodal LSA, but a savings is obtained in that a single summary address 44 is advertised representing N tail nodes 34. Further (and significant) savings are obtained by replacing the two (or more) link LSAs with a connectivity vector 46 comprising a single bit (or a set of two or more bits for more granular information) for each tail node 34.

Information in conventional Link LSAs includes bandwidth availability on the link, link's attributes such as admin weight or cost, its color or resource class, and many other attributes typically used in the route computation to enable appropriate steering/discrimination of routes. For example, a link's admin weight or cost is conventionally used to calculate the most optimal (cheapest) end-to-end route of a connection. However, the present Applicants have recognised that links 28 inter-connecting tail nodes 34 and host nodes 24 must always be used by the tail node 34 to gain access to the core network 32 and thus cannot be avoided/discriminated. For example, if the cost of using a given tail-to-host link 28 is X dollars then the cost of an end-to-end route to the tail node 34 attached to that link must be at least X dollars, independently of the route taken through the core network 32. Therefore, link attributes such as cost are of limited value for links 28 between tail 34 and host 24 nodes, as such links 28: are not used to tandem traffic/connections not destined for the particular inter-connected tail node 34, and must always be used to gain access to the core network 32.

The embodiments of the invention described above are intended to be illustrative only. The scope of the invention is therefore intended to be limited solely by the scope of the appended claims.

We claim:

1. In a network having a transport plane for carrying subscriber traffic within end-to-end connections and a control plane for managing at least a portion of resources of the transport plane allocated to the connections, a method of extending the control plane to a network edge, the method comprising:

designating a first set of control-plane enabled nodes of the network as core nodes, each core node being operable to route subscriber traffic between a pair of neighbour core nodes in the network;

designating a second set of control-plane enabled nodes of the network as tail nodes, each tail node being connected to at least one core node and operating only as a source or sink of subscriber traffic into or from the network;

designating one of the core nodes that is connected to one of the tail nodes as a host node; and controlling the host node to advertise summary information of its connected tail nodes to other core nodes in the network.

2. The method as claimed in claim 1, wherein the host node is controlled to propagate link state messages received from other core nodes to its connected tail nodes.

3. The method as claimed in claim 1, wherein the host node is controlled to prevent propagation of link state messages received from other core nodes to its connected tail nodes.

4. The method as claimed in claim 1, wherein the summary information comprises a summary address.

5. The method as claimed in claim 4, wherein the summary address comprises a respective area identifier uniquely identifying a set of one or more tail nodes connected to the host node.

6. The method as claimed in claim 5, wherein the area identifier is derived from a network address of the host node.

7. The method as claimed in claim 5, wherein the area identifier is derived from network addresses of the set of one or more tail nodes.

8. The method as claimed in claim 5, wherein each one of the set or tail nodes identified by a given area identifier have identical connections to the network.

9. The method as claimed in claim 1, wherein the summary information comprises a connectivity vector.

10. The method as claimed in claim 9, wherein the connectivity vector comprises a binary sequence, each bit position of the binary sequence representing a respective one of the tail nodes attached to the host node, and a respective binary value of each bit position representing whether or not the respective tail node can be reached through the host node.

11. The method as claimed in claim 9, wherein the connectivity vector comprises a binary sequence including a respective set of two or more bit positions for each tail node attached to the host node, and wherein a respective binary value of each set of bit positions represents information regarding connectivity between the host node and the respective tail node.

12. The method as claimed in claim 11, wherein the information regarding connectivity between the host node and the respective tail node comprises an available bandwidth for connections to the tail node.

13. In a network having a transport plane for carrying subscriber traffic within end-to-end connections and a control plane for managing at least a portion of resources of the transport plane allocated to the connections, a network node for extending the control plane to a network edge, the network node comprising:

at least one interface to a set of control-plane enabled core nodes of the network, each core node being operable to route subscriber traffic between a pair of neighbour core nodes in the network;

at least one interface to a set of control-plane enabled tail nodes of the network, each tail node operating only as a source or sink of subscriber traffic into or from the network; and the network node being configured to advertise summary information of its connected tail nodes to other core nodes in the network.

14. The network node as claimed in claim 13, wherein the network node is controlled to propagate link state messages received from other core nodes to its connected tail nodes.

15. The network node as claimed in claim 13, wherein the network node is controlled to prevent propagation of link state messages received from other core nodes to its connected tail nodes.

16. The network node as claimed in claim 13, wherein the summary information comprises a summary address.

17. The network node as claimed in claim 16, wherein the summary address comprises a respective area identifier uniquely identifying a set of one or more tail nodes connected to the host node.

18. The network node as claimed in claim 17, wherein the area identifier is derived from a network address of the host node.

19. The network node as claimed in claim 17, wherein the area identifier is derived from network addresses of the set of one or more tail nodes.

20. The network node as claimed in claim 13, wherein the summary information comprises a connectivity vector.

21. The network node as claimed in claim 20, wherein the connectivity vector comprises a binary sequence including a respective set of two or more bit positions for each tail node attached to the host node, and wherein a respective binary value of each set of bit positions represents information regarding connectivity between the host node and the respective tail node.

* * * * *